US005783032A

United States Patent [19]

O'Callaghan et al.

[11] Patent Number: 5,783,032

[45] Date of Patent: Jul. 21, 1998

[54] LINERLESS LABEL APPLICATOR

[75] Inventors: John S. O'Callaghan, Wilmette; Tomasz Bednarek, Niles; Metin M. Durum, Elmhurst; Narasimha Swamy, Streamwood, all of Ill.

[73] Assignee: Bell & Howell Postal Systems Inc.

[21] Appl. No.: 725,245

[22] Filed: Oct. 4, 1996

[51] Int. Cl.$^6$ .......... B32B 31/00

[52] U.S. Cl. .......... 156/556; 156/521; 156/355; 156/442

[58] Field of Search .......... 156/556, 517, 156/521, 353, 354, 355, 442, 571, DIG. 1, DIG. 2, DIG. 42

[56] References Cited

U.S. PATENT DOCUMENTS

| | | | |
|---|---|---|---|
| 2,414,019 | 1/1947 | Carter | 156/DIG. 42 X |
| 3,035,695 | 5/1962 | Buchwald et al. | 209/82 |
| 3,261,464 | 7/1966 | Levy | 209/72 |
| 3,396,505 | 8/1968 | McCrudden . | |
| 3,573,748 | 4/1971 | Holme | 340/172.5 |
| 3,713,948 | 1/1973 | Kluger | 156/355 X |
| 3,729,362 | 4/1973 | French et al. | 156/542 |
| 3,769,139 | 10/1973 | Woods | 156/358 |
| 3,984,277 | 10/1976 | French et al. | 156/497 |
| 3,985,603 | 10/1976 | Berner | 156/235 |
| 3,989,575 | 11/1976 | Davies et al. | 156/355 |
| 4,004,039 | 1/1977 | Shoaf et al. | 426/548 |
| 4,250,690 | 2/1981 | Lorenzen et al. | 53/475 |
| 4,310,276 | 1/1982 | Castagnoli | 414/134 |
| 4,314,644 | 2/1982 | Stocker | 209/569 |
| 4,519,868 | 5/1985 | Hoffmann | 156/353 |
| 4,547,252 | 10/1985 | LaMers | 156/497 |
| 4,581,094 | 4/1986 | Sato | 156/352 |
| 4,585,506 | 4/1986 | Matsuguchi | 156/361 |
| 4,612,079 | 9/1986 | Ostrow | 156/497 |
| 4,624,734 | 11/1986 | Voltmer et al. | 156/541 |
| 4,629,528 | 12/1986 | Tanaka et al. | 156/351 |
| 4,676,859 | 6/1987 | Cleary, Jr. et al. | 156/361 |
| 4,687,535 | 8/1987 | Voltmer | 156/361 |
| 4,707,211 | 11/1987 | Shibata | 156/354 |
| 4,787,953 | 11/1988 | Trouteaud et al. | 156/387 |
| 4,853,063 | 8/1989 | Basgil et al. | 156/238 |
| 5,076,879 | 12/1991 | Svyatsky | 156/361 |
| 5,133,980 | 7/1992 | Ream et al. | 426/115 |
| 5,149,392 | 9/1992 | Plaessmann | 156/542 |
| 5,188,696 | 2/1993 | Good, Jr. | 156/361 |
| 5,232,540 | 8/1993 | Southwell et al. | 156/361 |
| 5,254,206 | 10/1993 | Wing | 156/542 |
| 5,375,752 | 12/1994 | Michalovic | 225/2 |
| 5,378,301 | 1/1995 | Boreali et al. | 156/344 |
| 5,413,651 | 5/1995 | Otruba | 156/64 |
| 5,417,783 | 5/1995 | Boreali et al. | 156/64 |
| 5,431,763 | 7/1995 | Bradshaw | 156/256 |
| 5,484,082 | 1/1996 | Casper et al. | 221/305 |
| 5,518,160 | 5/1996 | Michalovic | 225/106 |
| 5,522,588 | 6/1996 | Soltysiak | 270/58.07 |
| 5,540,369 | 7/1996 | Boreali et al. | 225/4 |

*Primary Examiner*—James Engel
*Attorney, Agent, or Firm*—Sonnenschein Nath & Rosenthal

[57] ABSTRACT

A linerless label applicator for forming and applying a discrete, pressure sensitive adhesive linerless label to a document is adapted to receive and advance a plurality of documents, one at a time, along a document path through the applicator. The applicator includes a label storage and feed section, a label cutting section and a label application section. The storage and feed section stores the label material in roll form thereon and feeds the material through a feed assembly into the cutting section. The label cutting section includes a label drive assembly, a label guide assembly and a cutting assembly. The drive assembly includes a feed roller and a plasma coated idler roller which contacts the label adhesive and prevents adhesion thereto. The guide assembly includes a fan/vacuum manifold which retains the non-adhesive side of the label material in contact with the cutting assembly surfaces. The cutting assembly includes self-lubricating stationary and moveable blades adapted to coact with one another to cut the label material into predetermined, discrete labels. The moveable blade is mounted to the cutting section by a parallelogram drive linkage which facilitates reciprocating and transverse movement of the blade to effect the label cut. The application section includes a vacuum provided paddle to hold the label in place while being cut and to transfer the label to a passing document. The application section includes a compression mechanism for compressing the label to the document.

19 Claims, 8 Drawing Sheets

LINERLESS LABEL APPLICATOR

FIELD OF THE INVENTION

This invention relates to an applicator for forming discrete labels from a continuous roll of linerless label material and applying the labels to a document. More particularly, the invention relates to an applicator for forming labels from a continuous roll of linerless label material and applying the labels in a sequential manner to documents such as envelopes, as the documents are conveyed through the apparatus.

BACKGROUND OF THE INVENTION

Due to the steadily increasing volume of mail which is handled by large businesses, institutions and government entities, such as the Postal Service, credit card companies and the like, the need for ever increasing speed and efficiency in handling such mail is a constant demand.

When mail is prepared by a mailing house or other entity that produces a large volume of mail, the mail generally includes a bar code or other indicia which is readable by a machine, such as an optical character reader ("OCR") or bar code reader, for automated sorting and forwarding. However, at times, such indicia can become smeared, the background can interfere, or other things can prevent readability by the machine. In order to preserve the automated process, a label suitable for receiving machine readable indicia must be prepared and applied to the envelope.

Various types of apparatus exist which are configured to prepare and apply such machine readable labels. In a typical configuration, such a label applicator includes a document feed section, a read section, a label selection section which permits the selection of an appropriate label for applying to the document, a label applicator section and a sorting and storage section for sorting and storing the documents for further handling. Exemplary of such a device is that disclosed in U.S. Pat. No. 5,076,879. Often, labels are applied by one device and the OCR readable indicia is printed on the labels by a subsequent automatically or manually controlled device.

Such prior art devices have, for the most part, proven satisfactory. Nevertheless, the known devices are typically large, unwieldy machines that may require a substantial amount of maintenance. Maintenance can be particularly high with respect to the applicator section if the applicator uses labels having liners thereon. It has been observed that the labels can become jammed in the applicator. When labels become jammed, it requires that the operation be shut down to effect maintenance. Shutting down the applicator section can result in shutting down the overall sorting and handling operation.

Moreover, such machines typically require frequent replenishment with labels. This is particularly so with applicators which use labels having backing paper or a liner adhered to the adhesive side of the label. This is due, in part, to the increased volume of a roll which includes both labels and liners adhered thereto.

Accordingly, there continues to be a need for a linerless label applicator which is relatively compact in size, requires less maintenance than known devices, and can store and use large, rolled linerless label stock. Such a machine preferably includes a mechanism to reduce the curling effect commonly exhibited in devices which use rolled label stock. Most preferably, such an applicator includes a minimum of moving parts and provides ready access to the internal components thereof for maintenance and testing.

SUMMARY OF THE INVENTION

A linerless label applicator for forming and applying a discrete linerless label to a document, includes a label material storage and feed section, a label cutting section and a label application section. The applicator is adapted for use with a continuous source of linerless label material such as that provided in roll form. The linerless label material typically has a first, adhesive carrying side and a second, non-adhesive carrying side. The second side may be used for printing indicia, such as machine readable indica, thereon. The applicator is adapted to receive and advance a plurality of documents, one at a time, along a document path through the applicator, and to form, by cutting, and apply a discrete label to the documents.

The label storage and feed section includes a storage member that is adapted to store the continuous source of linerless label material. In a preferred embodiment, the storage and feed section includes a horizontally oriented, vertically moveable label material feed member. The feed member is configured to hold and feed the label material therefrom. In the preferred embodiment, the storage and feed section includes a horizontally oriented tangent roll in continuous contact with the roll of label material. The vertical movement of the roll of label material, which is effected by gravity acting on the roll, maintains the roll in contact with the tangent roll. The storage and feed section may include a brake arrangement having an elastomeric or like brake element thereon to provide tension in the label material as it is fed from the feed member. The tangent roll and brake arrangement minimize or reduce the curling of the label material as it is pulled from the roll.

The storage and feed section includes a drive assembly which is adapted to feed the material therefrom on demand, as required by the apparatus 10, along a label feedpath. In a preferred embodiment, the drive assembly includes a pair of feed rollers configured to feed the label material from the storage member. One of the rollers is positioned to contact the adhesive carrying side of the label material and the other roller is positioned to contact the non-adhesive carrying side of the label material. Preferably, the adhesive contacting roller is an idler roller and has a plasma or like coating thereon to prevent the label material from adhering to the roller.

The label cutting section includes label drive means, label guide means and a label cutting assembly. The cutting section is adapted to receive the continuous label, advance the material in discrete, predetermined amounts, and cut labels from the continuous label material. The guide means includes a vacuum manifold having a surface configured to receive the label material with the non-adhesive side thereon. The surface includes a plurality of vacuum openings therein in flow communication with an associated vacuum producing source for effecting a vacuum in the openings at the manifold surface.

The guide means further includes a plurality of guide elements projecting from the surface. The guide elements define a label travel path for the label material through the cutting section and maintain the label material in contact with the vacuum manifold. The cutting assembly includes a stationary cutting blade and a moveable cutting blade mounted adjacent to the stationary blade. The blades coact with one another for cutting the label material at a predetermined position to form the discrete labels. The moveable blade includes a cutting edge and has drive means operably connected thereto for moving the blade in a reciprocating path toward and away from and transverse to a plane defined by the label travel path. The moveable blade further includes a stripper member mounted thereto. In a preferred embodiment, the stripper has a lubricating well therein, which is in spaced relation to the cutting edge. The lubricating well is configured to store a quantity of a lubricating material, preferably saturated into a wicking material to lubricate the stationary and moveable blades to reduce friction therebetween, and to minimize the tendency of the label adhesive to build up on the cutting elements.

In a preferred arrangement, the cutting section includes a pair of feed rollers configured to feed the label material therethrough. One of the rollers is positioned so as to contact the adhesive carrying side of the label material. The adhesive contacting roller includes a non-adhering surface. In the preferred embodiment, the roller includes a plasma coating to prevent the label material from adhering to the roller.

The moveable cutting blade is driven by a parallelogram linkage drive assembly for moving the blade in a reciprocating movement between a cutting position and a withdrawn position. The parallelogram linkage includes a pair of flexible connectors extending generally transversely between the cutting section and the moveable blade to guide the blade between the cutting and withdrawn positions. The flexible connectors are mounted to the blade and the cutting section by arcuately shaped radius guides. The radius guides define a range of flexure of the flexible connectors which reduces the fatigue stresses in the flexible connectors during operation. The blade is driven by a double acting piston-like pneumatic cylinder.

The label application section has a pivotal paddle member mounted thereto, and drive means for pivoting the paddle member between a receiving position for receiving a label thereon and an applying position for applying the discrete label to a passing document. Preferably, the paddle is driven by a double acting pneumatic cylinder. The paddle has a vacuum region and vacuum openings which provide vacuum to a label contacting surface of the paddle to secure the label thereto.

Preferably, the label application section includes a compression section having at least one back-up roller and a compression roller in opposing relation thereto. The compression section is adapted to advance the document between the back-up roller and the compression roller to adhere the label to the document.

In a preferred embodiment, the applicator includes a control system operably connected to the label storage and feed section drive means, the label cutting section drive means, the moveable blade drive means and the paddle drive means. The control system includes a central processor or controller and a plurality of sensors. The sensors are positioned to detect the presence of the linerless label material in the label feed path and the presence of a document in the document travel path. The control system may be configured to automatically advance label material into the cutting section, cut discrete labels and actuate the paddle to apply the labels to the passing documents. In a most preferred configuration, the control system includes trouble or malfunction indication to indicate a malfunction of the system.

Other features and advantages of the present invention will be apparent from the following detailed description, the accompanying drawings, and the appended claims.

DETAILED DESCRIPTION OF THE PREFERRED EMBODIMENTS

Figure 1:
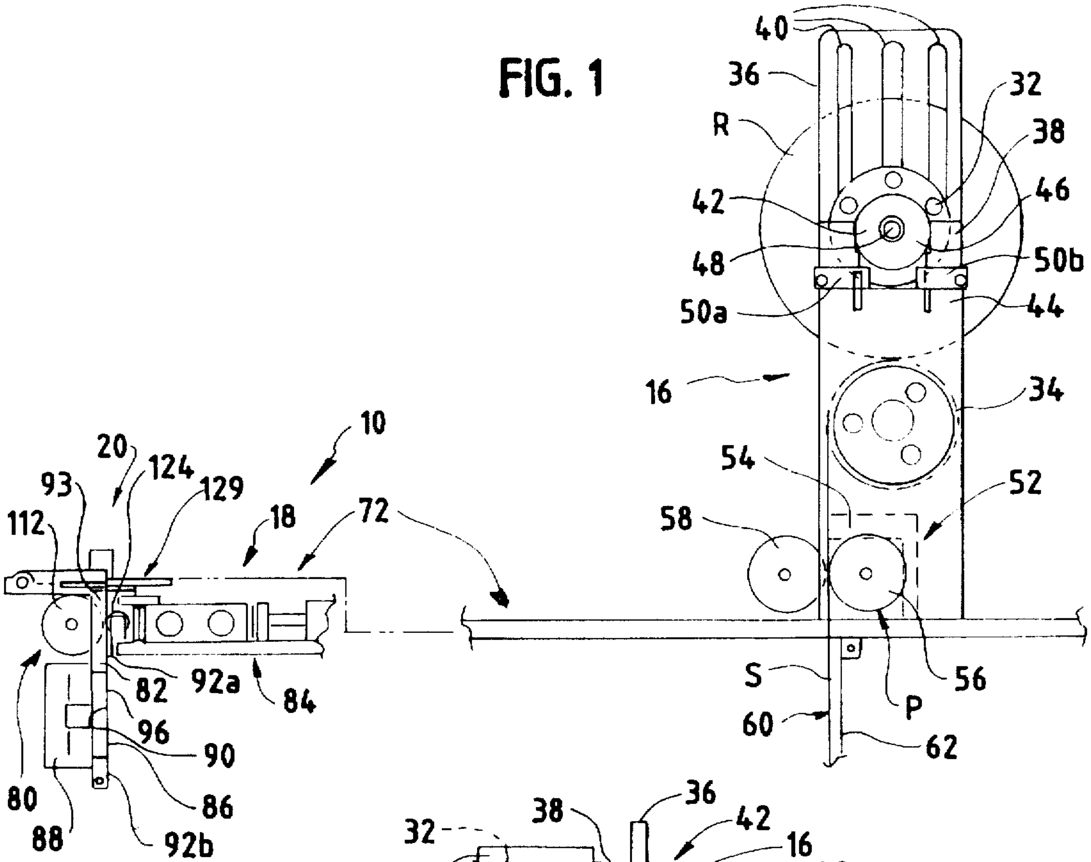
FIG. 1 is a partial side elevational view of the label stock storage and feed section, the cutting section and the application section of a linerless label applicator embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Figure 2:
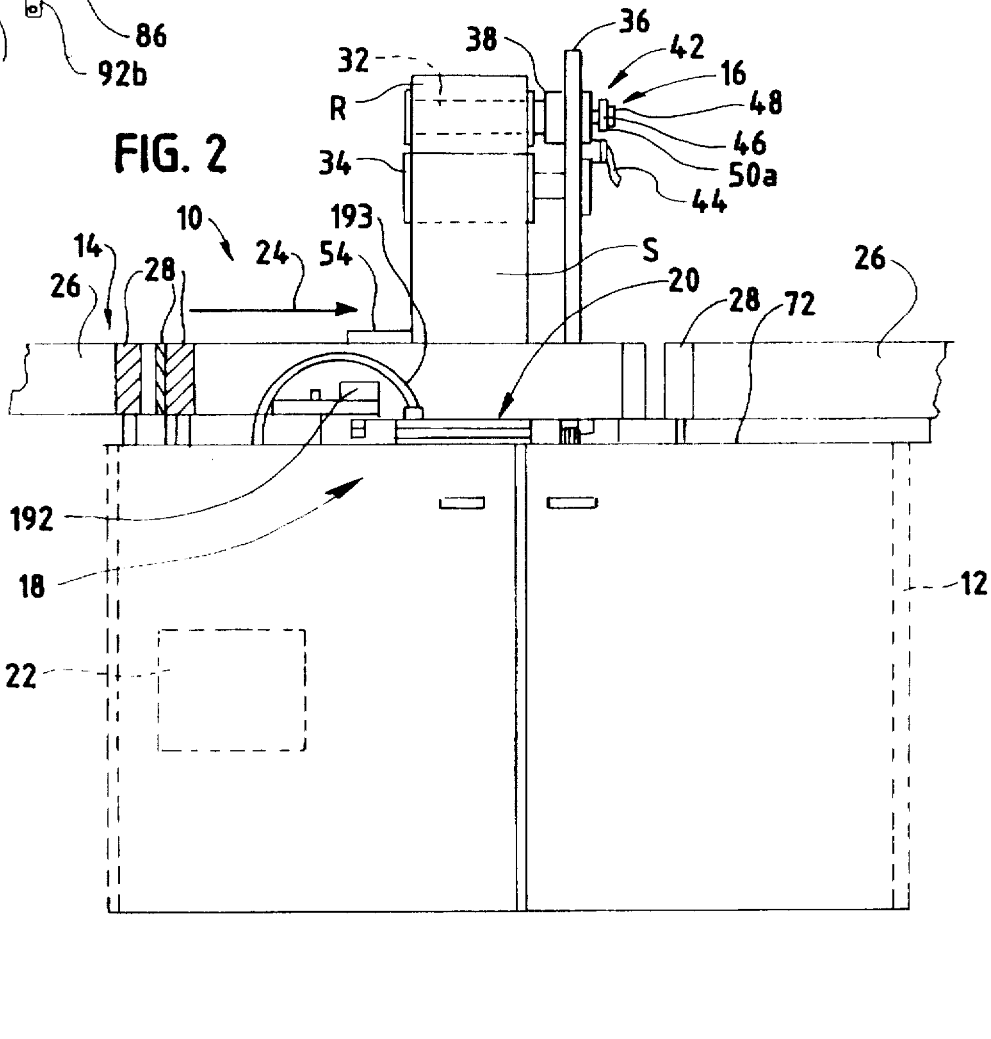
FIG. 2 is a front elevational view of the applicator, shown mounted in a cabinet-like enclosure.
Figure 3:
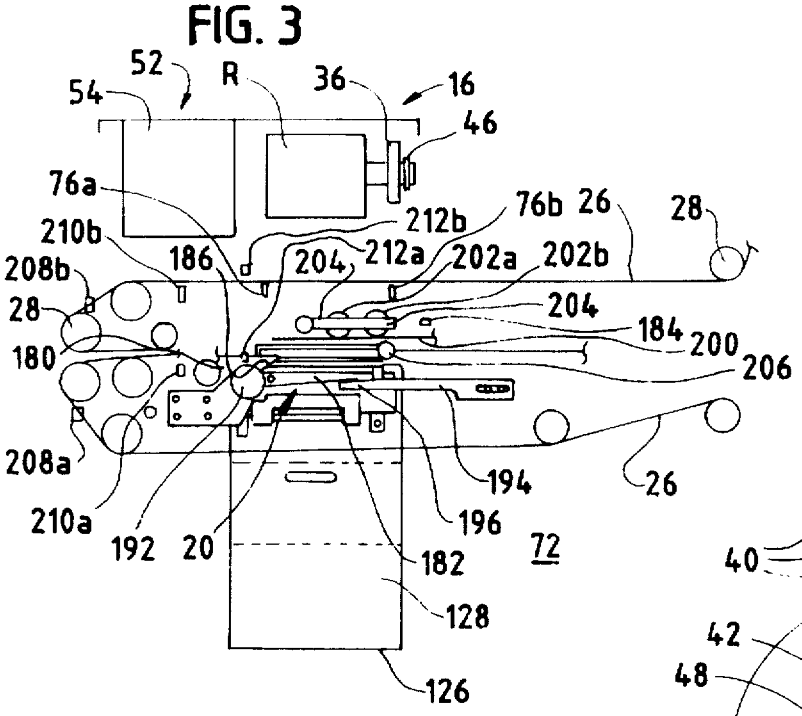
FIG. 3 is a top plan view of the applicator of FIG. 2, shown with portions of the drive belts removed for clarity of illustration.
Figure 10:
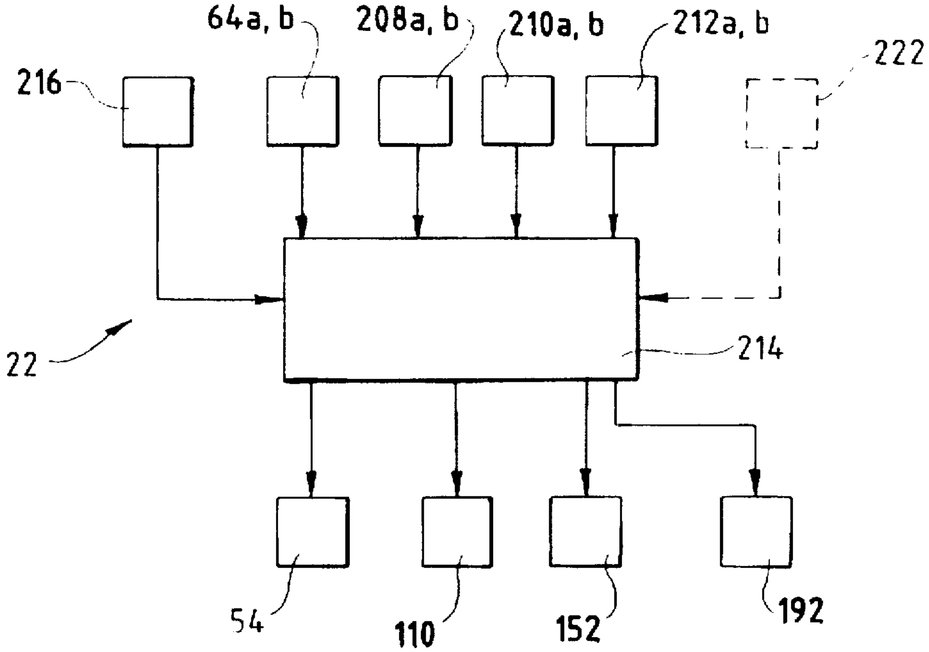
FIG. 10 is a schematic illustration of an embodiment of a control system for the applicator.
Figure 11A:
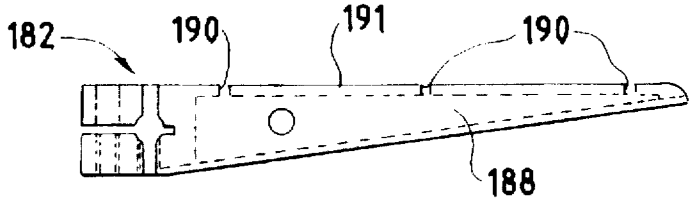
FIG. 11*a* is top plan view of the paddle member of the application section, illustrated with the vacuum region shown in phantom lines.
Figure 11B:
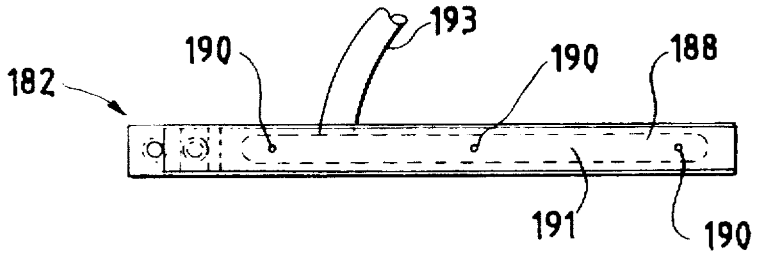
FIG. 11*b* is a front elevational view of the paddle member of FIG. 11*a*, as viewed from the label contacting side thereof, with the vacuum region illustrated in phantom lines.

With reference now to the figures and in particular to FIGS. 1–3, there is shown a linerless label applicator 10 embodying the principles of the present invention. The applicator includes generally a frame 12 having a document transport mechanism 14, a label storage and feed section 16, a label cutting section 18, and a label application section 20 mounted thereto. As illustrated in FIG. 10, the applicator 10 can include a control system 22 for automatically controlling the operation of the applicator 10.

The applicator 10 is configured to feed linerless label stock in sheet form S from a roll R, receive the sheet form stock S in the cutting section 18, cut labels L to a predetermined size, and apply the labels L to documents, such as envelopes, that are fed through the applicator 10. The documents are fed by a document transport mechanism 14 into and advanced through the applicator 10 along a document feed path 24. The document feed path 24 is oriented generally transverse to the label stock S fed through the applicator 10.

In a typical arrangement, the document transport mechanism 14 includes a plurality of moving belts 26 which are adapted to feed the documents into, through, and out of the applicator 10, one document at a time. The belts 26 are driven by a plurality of rollers 28, at least some of which are driven rollers, and the others of which are idler rollers providing rotating pivotal points for the moving belts 26. The documents are advanced from the applicator 10 by a similar arrangement of moving belts 26. Likewise, the documents are advanced through the applicator 10 by a similar arrangement of moving belts 26, the arrangement of which will be recognized by those skilled in the art.

The linerless label material can be of the pressure sensitive adhesive ("PSA") type. Such a PSA label generally includes a substrate, such as paper, and a pressure sensitive adhesive applied to one surface of the substrate. The pressure sensitive adhesive permits the continuous label stock to be rolled onto itself without a backing paper or liner positioned between the adhesive and the adjacent substrate layer. The linerless labels may include a release coat to facilitate separating the label layers from each other. Commonly, such a release coat permits indicia to be printed on the label. The linerless type label greatly reduces the bulk of the labels in that a layer of liner material is not required to store the labels in rolled stock form.

As will be recognized by those skilled in the art, the rolled stock form R, can result in curling of the label sheet stock S as it is "pulled" from the roll R. This curling phenomena could cause handling difficulties in linerless label applicators. The curling phenomena has been observed to be greatest when the label sheet stock S is pulled from the roll R in a direction perpendicular to the point tangent to the roll R at which the sheet stock is removed, i.e., when the sheet stock S is pulled radially from the label roll R. Conversely, curling has been observed to be reduced when the sheet stock S is pulled from the roll R tangent to the roll R at the point at which the sheet stock S is pulled. Thus, the curling effect is reduced by maintaining the sheet stock S being pulled as close to tangent as possible, relative to the roll R.

The label storage and feed section 16 of the present applicator 10 includes an arrangement which produces a tangent pulling effect thus reducing curling of the label sheet stock S. The feed section 16 includes a horizontally oriented feed spool 32 which is adapted to store the linerless label material stock in roll form R, and to permit feeding the roll stock R into the cutter section 18. The tangent pulling arrangement is effected by a tangent roll 34 which is mounted below the feed roll R and kept in continuous contact therewith. The feed roll R is mounted to permit vertical movement thereof relative to the tangent roll 34, which maintains the feed roll R in contact with the tangent roll 34 as the sheet stock is pulled therefrom.

The feed spool 32 and tangent roll 34 are mounted to an upright support member 36. The feed spool 32 is mounted to the support 36 by a vertically slidably carriage 38 which rides in a track or channel 40. Gravitational forces acting on the feed roll R provides the driving force for vertical movement of the feed roll R downward as the sheet stock S is fed therefrom. This arrangement maintains the feed roll R in contact with the tangent roller 34 as the sheet stock S is fed from the feed roll R and as the feed roll R consequently reduces in size. The feed roll R is secured to the spool 32 by a plurality of spring pins or clips (not shown) which frictionally hold the roll R in place on the spool 32.

The feed spool 32 includes a band brake mechanism 42 mounted thereto to effect tension in the label sheet stock S as it is pulled from the feed roll R. The brake 42 essentially provides resistance to rotation of the roll R and spool 32. In the illustrated embodiment, the brake 42 includes an elastomeric member 44 positioned about a pulley-like roller 46 fixed to a shaft 48 which is connected to the feed spool 32. The elastomeric member 44 is clamped in place, at both ends, by clamps 50*a,b*, and essentially creates a friction force on the spool 32 and roll R to resist movement thereof.

Advantageously, the elastomeric member 44 provides not only a braking force, but also tends to eliminate slack in the sheet stock S supply as the stock S is fed from the roll R. As the sheet stock S is pulled from the roll R, the elastomeric member 44 is stretched as the pulley 46 rotates. When the demand on the sheet stock S is met and the roll R stops rotating, the elastomeric member 44 tends to rewind the roll R slightly to reduce slack in the sheet stock S. The band brake 42 in combination with the continuous contact between the feed and tangent rolls R, 34 maintain the "pull" tangent to the roll R, and thus greatly reduce curling of the label sheet stock S as it is pulled from the roll R.

Figure 4:
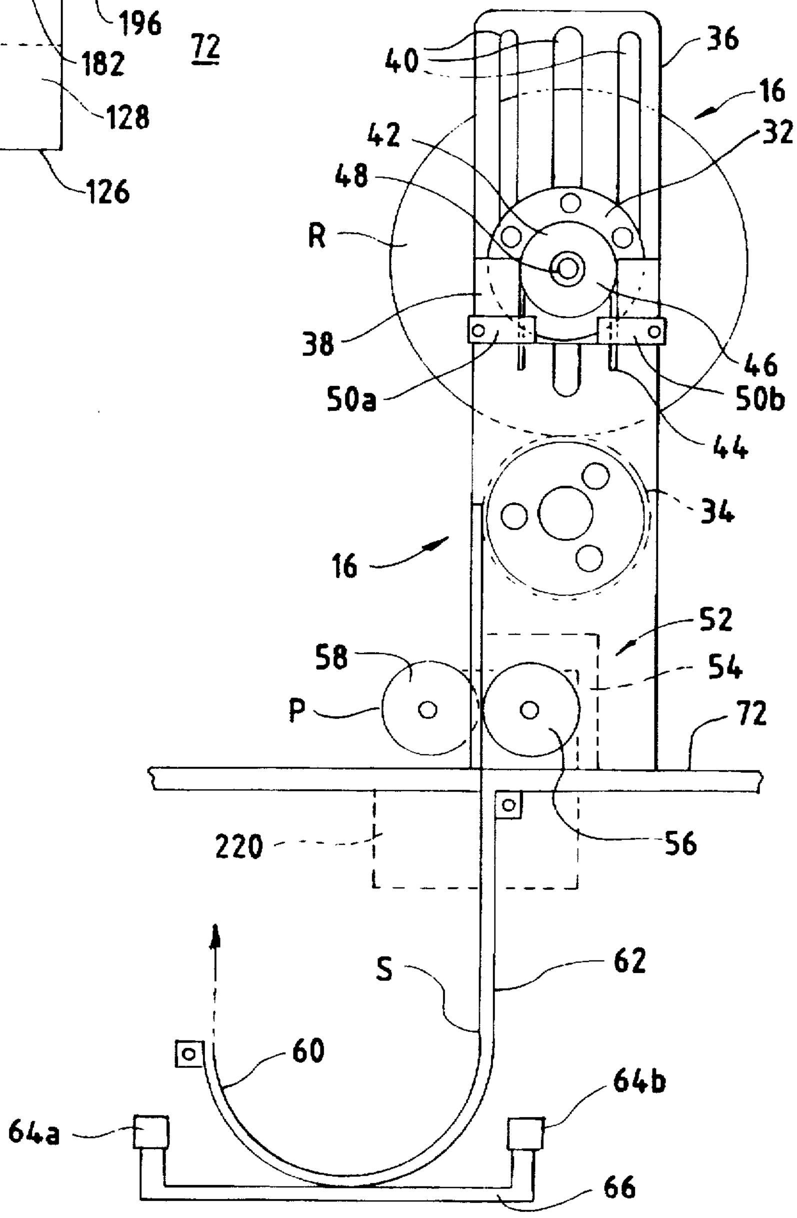
FIG. 4 is a side elevational view of the storage and feed section of the applicator.
Figure 4A:
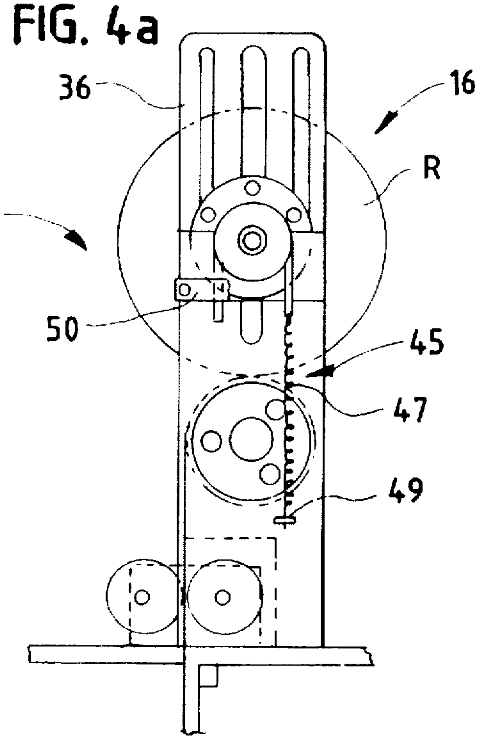
FIG. 4*a* is a side elevational view of the storage and feed section of the applicator similar to FIG. 4, illustrated with a self-compensating tensioning system.

Optionally, the label storage and feed section 16 can include a self-compensating tensioning system 45, as illustrated in FIG. 4*a*. The self-compensating tensioning system 45 is similar to the band brake 42, except that the elastomeric member 44 is fixedly clamped by a clamp 50 at one end only. The other end of the member 44 has a biasing element, such as the exemplary coil spring 47, mounted thereto. An opposing end 49 of the coil spring is mounted to a stationary portion of the applicator system 10. The self-compensating tensioning system 45 provides balanced unwind tension in the sheet stock S, independent of the roll R diameter.

The label storage and feed section 16 includes a feed drive system 52 including drive means such as the exemplary drive motor 54. The drive motor 54 is operably connected to a feed roller 56 for pulling the linerless label stock S from the roll R and advancing the sheet stock S toward the cutter section 18. The feed roller 56, which is in contact with the non-adhesive side of the sheet stock S, may be formed of a pliant material, such as silicon and the like. The feed roller 56 may be treated, such as with a silicon oil, to reduce adhesion of adhesive which may be transferred onto the roller 56. The feed system 52 includes an idler roller 58 which has a surface which is treated to reduce the opportunity for the label stock to adhere to the feed roller. In a current embodiment, the idler roller 58 is coated with a plasma material P available from Plasma Coatings of Mn., of Bloomington, Minn., available as coating #936. The plasma coating P reduces the accumulation of adhesive on the roller 58 in contact with the adhesive side of the sheet stock S, which may otherwise occur with a non-treated roller. The accumulation of adhesive can result in the sheet stock S sticking to the roller 58 and jamming the feed system 52.

The sheet stock S is fed by the rollers 56, 58 downwardly through the label guide path 60, best seen in FIGS. 1 and 4, to the cutting section 18. A guide plate 62 extends downwardly from below the rollers 56, 58 and curves forwardly and upwardly to guide the sheet stock S into the cutting section 18. As will be described in more detail herein, the guide plate 62 has a pair of sensors 64a,b mounted to a sensor bracket 66 extending transversely therefrom near the lower most portion of the guide plate 62. The sensors *64a,b* detect the absence and presence of label sheet stock S in the label stock guide path 60.

Figure 5:
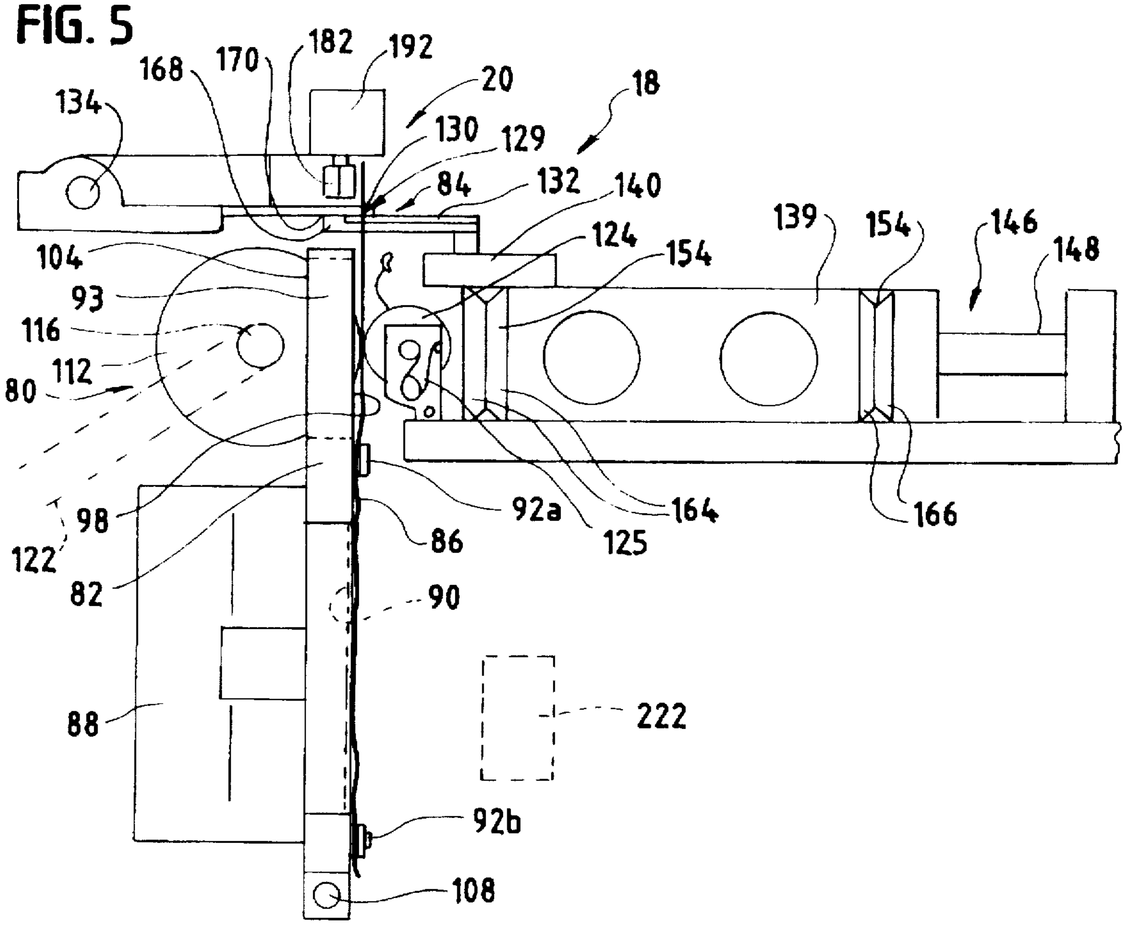
FIG. 5 is a partial side elevational view of the cutting section of the applicator, illustrated with portions of the supporting members removed for clarity of illustration, and shown with label sheet stock positioned in the label path.
Figure 6:
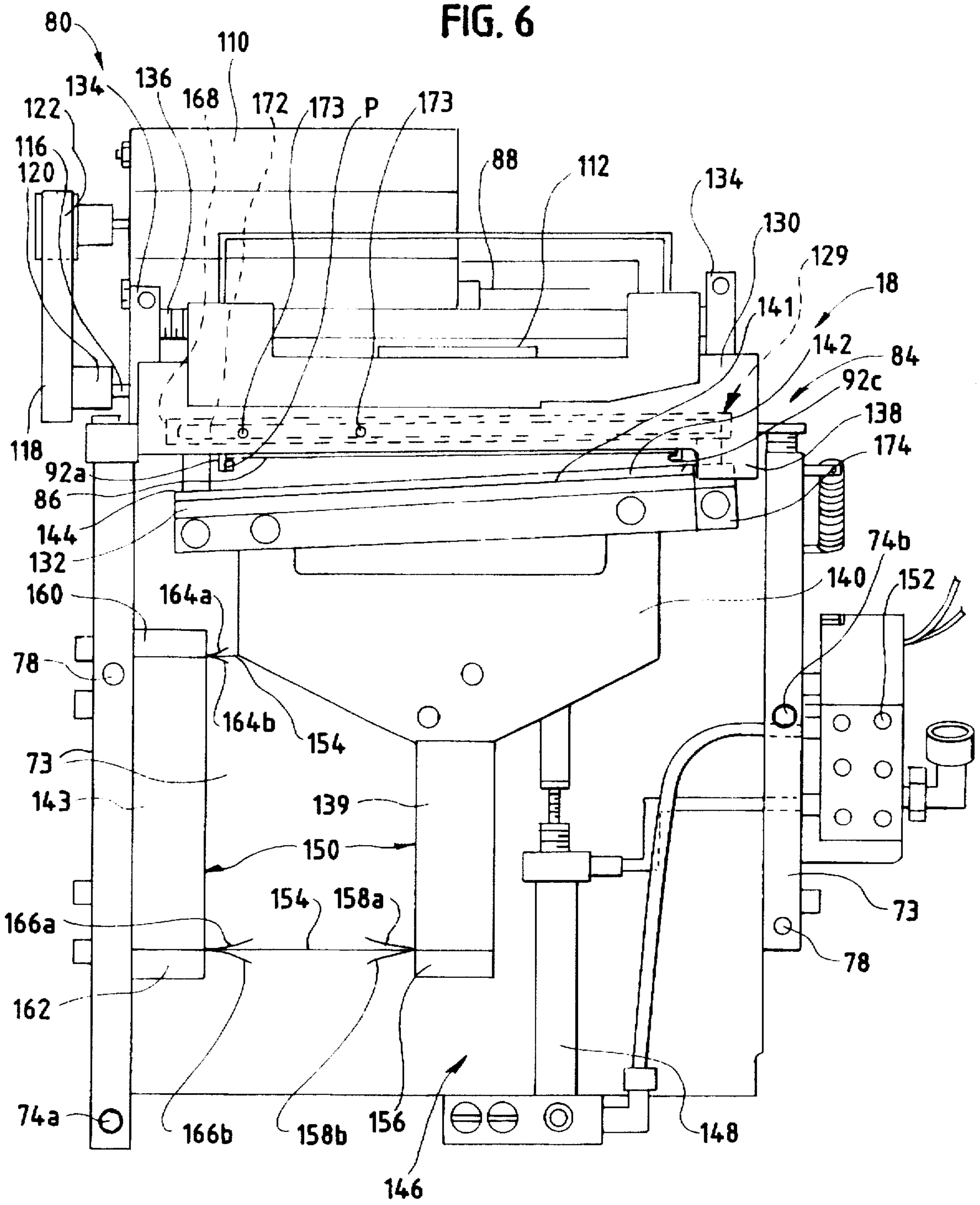
FIG. 6 is a top plan view of the cutting section of the applicator, illustrated with the moveable blade in the withdrawn position.

The cutting section 18, which is illustrated in FIGS. 5 and 6, is a compact, integrated unit which is mounted to the top plate 72 of the applicator 10. The cutting section 18 is configured to be removable as a single, modular unit so that the section 18 can be removed for maintenance or testing as required. The cutting section 18 has a pair of bolts *74a,b* extending therefrom which are adapted to engage a complementary pair of key-hole slots *76a,b* in the top plate 72. A pair of threaded openings *78a,b* in the cutting section frame 73 can receive an additional pair of bolts (not shown) to maintain the cutting section 18 in place in the applicator 10.

The cutting section 18 includes a feed mechanism 80, a vacuum manifold/fan support section 82 and a cutting assembly 84 mounted thereto. The label sheet stock S is fed upward into the cutter section 18, as illustrated in FIG. 5, through a label travel path 86. The stock S is fed into the cutting section 18 with the non-adhesive side adjacent to the manifold/fan section 82. A fan 88 is mounted to the manifold/fan section 82 and has a perforated plate 90 between the fan 88 and the label travel path 86. The fan 88 is configured to pull the label stock S toward the fan 88 and against the plate 90. A plurality of projecting tabs *92a–d* extend from the manifold/fan section 82 and guide the label stock S therethrough. The tabs *92a–d* have an L-shaped cross section to retain the stock S in place in the label travel path 86 and to maintain the label stock S in contact with the manifold/fan section 82. The tabs *92a–d* may include a coating, such as the aforementioned plasma coating P thereon to prevent the label stock S from sticking to the tabs *92a–d*.

The manifold portion 93 of the manifold/fan section 82 is best seen in FIGS. *8a* and *8b*. The manifold portion 93 includes a plurality of channels 94 therein which terminate in vacuum openings *96a–e* at the label contact surface 98 of the manifold 93. The channels 94 provide flow communication between a vacuum source (not shown) and the vacuum openings *96a–e*. In a preferred embodiment, the channels 94 are formed in curved or arcuate paths, rather than angled paths. This reduces the opportunity for accumulation of paper dust and the like in the channels 94. The arcuate turns also facilitate reducing or eliminating burrs which may otherwise result if the manifold 93 is machined with angled turns.

A transverse channel 100 is formed through the manifold 93 which connects the upright channel portions 94. The transverse channel 100 facilitates creating a vacuum opening *96c* at about the middle top portion of the manifold 93. The middle opening *96c* facilitates a balanced vacuum across the label stock S as it passes across the manifold 93. The ends *100a,b* of the transverse channel 100 can be plugged with removable, threaded plugs *102a,b*. The removable plugs *102a,b* permit cleaning the manifold 93 by providing a through channel which can accommodate a rod or like cleaning device (not shown).

The non-contact side of the manifold 104 includes a port 106 for providing vacuum to the channel system 94. The port 106 is connected to the vacuum system, which vacuum system may be commonly connected with various other parts of the applicator system 10. The manifold/fan section 82 is mounted to the cutting section frame 73 by a hinge 108 to permit the manifold/fan section 82 to be rotated downwardly, to access the inside of the cutting section 18 for maintenance and testing.

Referring to FIGS. 5 and 6, the feed mechanism 80 is mounted to the manifold/fan section 82 to feed the label stock S through the cutting section 18. The feed mechanism 80 includes a feed drive, such as the exemplary motor 110. A feed roller 112 is positioned, extending through the manifold/fan section 82, to contact and advance the label stock S through the cutting section 18. The feed roller 112, which contacts the non-adhesive side of the label stock S, may be formed of a pliant material, such as silicon and the like, similar to the storage and feed section 16 feed roller 56. The feed roller 112 is mounted to a shaft 116 having a drive pulley 118 mounted to an end thereof, adjacent to a bearing 120. A drive belt 122 operably connects the drive motor 110 to the feed roller 112.

An idler roller 124 is positioned in opposing relation to the drive roller 112, and is configured to advance the sheet stock through the cutting section 18. Like other portions of the applicator 10 which contact the adhesive side of the sheet stock, the idler roller 124 may be coated with a plasma or like coating P to reduce the opportunity for the sheet stock S to adhere to the roller 124. The roller 124 is mounted to the cutting section 18 to permit relatively free rotation thereof. Biasing elements, such as the exemplary torsion springs 125 (one shown), bias the roller 124 into contact with the roller 112.

Figure 8A:
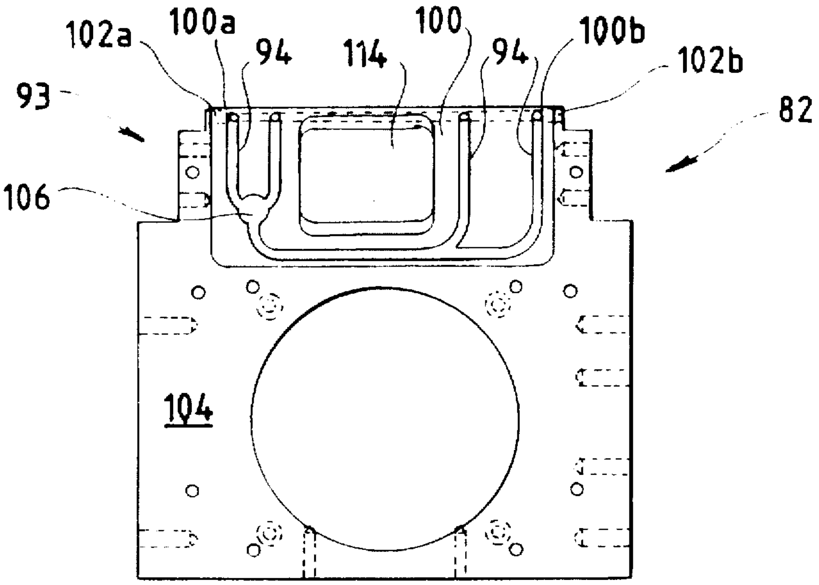
FIGS. 8*a* and 8*b* are rear and front elevational views, respectively, of the fan mount/manifold plate of the cutting section.
Figure 8B:
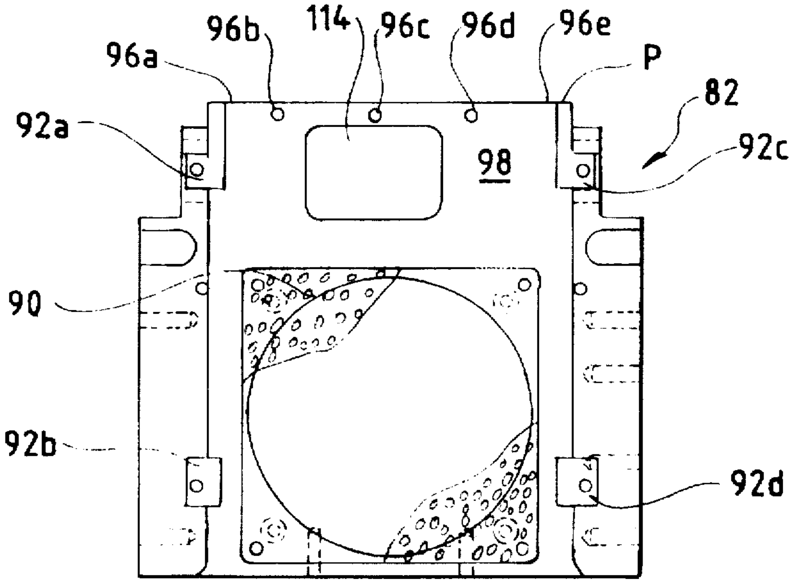

As will be seen from FIGS. 5 and 8, the feed mechanism 80 contacts the label stock S between the fan 88 and the vacuum openings *96a–e*. This configuration provides positive retention of the label sheet stock S in the cutting section 18 as the stock S approaches the cutting blades. In the present configuration, the feed and idler rollers 112, 124 are separated from one another when the manifold/fan section 82 is pivoted downwardly to open the cutting section 18. This permits ready access to the drive mechanism rollers 112, 124. As best seen in FIG. 3, the cutting section 18 is mounted to the plate 72 adjacent to a covered opening 126 therein. This configuration permits the cutting section 18 to be accessed by opening the cover 128 and opening the manifold/fan section 82, without removing the cutting section 18 from the applicator 10. This can greatly reduce the maintenance and testing time required for the applicator system 10.

Referring to FIGS. 5 and 6, the cutting section 18 includes a cutting assembly 129, having a stationary cutting blade 130 and a moveable cutting blade 132. The stationary cutting blade 130 is mounted above the moveable blade 132 and is mounted to the cutting section 18 by a hinge 134 to facilitate accessing the movable blade 132. The stationary blade 130 is biased downwardly, by a biasing member, such as the exemplary spring 136, into contact with the movable blade 132. The stationary blade 130 includes a contact tab 138 to maintain contact between the stationary and moveable blades 130, 132, even when the movable blade 132 is in the non-contact, withdrawn position, as illustrated in FIG. 6.

The moveable blade 132 is mounted to a blade arm 140, which, along with the 132 blade, is movable between a cutting position and the withdrawn position. The arm 140 is mounted to a movable drive block 139. As will be discussed in more detail herein, the moveable blade 132 has a cutting edge 141 which defines a leading edge 142 and a trailing edge 144. The leading edge 142 and trailing edge 144 are defined as those portions of the blade 132 which first contact the label stock S and last contact the label stock S, respectively, as the moveable blade 132 is actuated. The moveable blade 132 is advanced and withdrawn by a blade drive system 146 which includes a double acting pneumatic piston-like cylinder 148 and a parallelogram drive linkage 150. The double acting cylinder 148 is pivotally mounted to the cutter frame 73 to permit the cylinder 148 to pivot transverse to the direction of movement of the cylinder 148. An electro-pneumatic solenoid 152 is operably connected to the cylinder 148 to provide the required pneumatic supply to the cylinder 148.

As will be recognized by those skilled in the art, the double acting cylinder 148 is pressurized on one side to drive the piston forward, and thus the moveable blade 132 forward to the cutting position. In the reverse mode cycle, the cylinder 148 is pressurized on an opposite side to drive the piston rearward, and thus the blade 132 to the withdrawn position.

The parallelogram linkage drive 150 includes first and second flexible drive connectors 154 which permit forward and rearward movement of the blade 132 (i.e., into the cutting and withdrawn positions). The flexible connectors 154 are connected to the drive block 139 (at rigid clamping points) by mounting blocks 156 (one shown) which each support a pair of radius guides **158*a*,*b*. Similarly, the flexible connectors 154 are connected to a stationary guide block 143 (also at rigid clamping points) by mounting blocks 160, 162 which each support a pair of radius guides 164*a*,*b*, 166*a*,*b***.

The radius guides **158*a*,*b*, 164*a*,*b*, and 166*a*,*b* (and one pair not being shown) have an arcuate shape which reduces the stresses in the flexible connectors 154, at their respective rigid clamping points as they flex rearwardly and forwardly with movement of the blade arm 140 and moveable blade 132. Given that the moveable blade 132 can be acutated between the cutting and withdrawn positions as much as about 8 to 10 times per second (8 to 10 cycles per second), the radius guides 158, 164, 166 can greatly extend the life of the flexible connectors 154 by reducing the possibility of fatigue failure of the connectors 154 at their respective points of clamping. It will be recognized from a study of the present configuration that as the blade 132 moves forwardly and rearwardly, the parallelogram arrangement 150 causes the blade arm 140 and blade 132** to also move in a direction transverse to the forward and rearward direction.

Referring now to FIGS. 5, 6 and **7*a–e*, the moveable blade 132 includes a stripper element 168 which extends forwardly of the blade 132, and remains in contact with the lower surface 170 of the stationary blade 130. In a current embodiment, the stripper 168 includes a well 172 formed therein. The well 172 is configured to store a quantity of lubricating material M to lubricate the bottom surface 170 of the stationary blade 130 where the moveable and stationary blades 132, 130 contact one another and to prevent accumulation of adhesive. The stationary blade 130 may include openings 173 therein to facilitate refilling the well 172 with lubricating material M. The lubricating material M may be saturated into a wicking material W which is placed in the well 172**.

The type of lubricating material M used may be dependent upon the type of adhesive that is applied to the label sheet stock S. In a present configuration which uses linerless labels manufactured by Moore Business Corporation, Ltd., of Toronto, Canada, a silicon oil, such as polydimethylsiloxane fluid has been found to function well.

As best seen in FIG. 6, the cutting edge 141 of the moveable blade 132 is mounted to the blade arm 140 to form an angle of about 2½° relative to the stationary blade 130. The angled cutting edge 141, along with the parallelogram drive linkage 150 define the leading edge 142 of the blade 132. The blade 132 is also mounted at an upward angle of about 0.2° relative to the stationary blade 130 to assure continuous contact between the moveable and stationary blades 132, 130. In a current embodiment, the moveable blade 132 is back relieved as illustrated by the arrow at 174 in FIG. 6, at the region of contact between the leading edge 142 and the stationary blade 130 contact tab 138.

Figure 9:
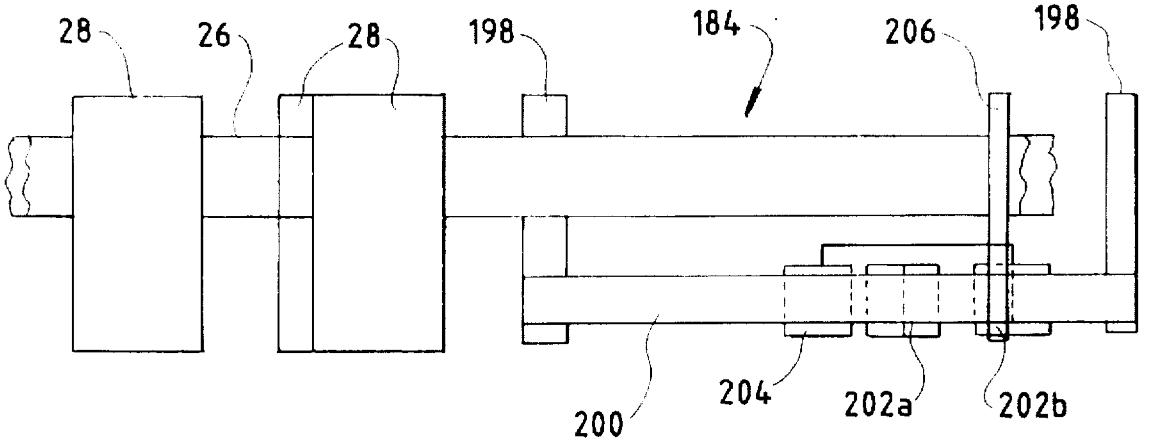
FIG. 9 is a partial front elevational view of the compression section of the applicator, shown with the drive belts partially broken away.

Referring now to FIGS. 3 and 9, the label application section 20 is mounted to the applicator 10 above the cutting section 18. The application section 20 includes a document guide 180, a label paddle 182 and a compression mechanism 184. As described previously, the documents are advanced through the applicator 10 by a plurality of moving belts 26. The document guide 180 is mounted adjacent to the moving belts 26 and includes a guide surface 186 which is provided to guide the documents into and through the label application section 20.

As best seen in FIGS. 3 and **11*a–b*, the paddle 182 is mounted to the applicator 10 immediately above the stationary blade 130. The paddle 182 is formed with a vacuum region 188 therein and includes a plurality of vacuum openings 190 on a side 191 thereof which contacts the non-adhesive side of the label L. In a preferred embodiment, the vacuum is continuously provided to the paddle 182 through a vacuum hose 193**.

The paddle 182 is actuatable between a receiving position wherein the paddle is oriented to receive a label L, and an application position wherein the paddle 182 transfers or applies the label L to the passing document. The paddle 182 is moved between the receiving position and the application position by a double acting pneumatic rotary cylinder 192 (FIG. 3). Similar to the blade cylinder 148, the paddle cylinder 192 is pressurized on one side to move the paddle 182 and thus the label L into contact with the passing document (the application position), and is likewise pressurized on an opposite side to move the paddle 182 into the receiving position for receiving a subsequent label L.

The vacuum openings 190 on the paddle 182 are provided to hold the label L on the paddle 182, with the non-adhesive side of the label L in contact with the paddle 182, as the label L is cut from the label sheet stock S and as the label L is transferred to the passing document. A paddle stop 194 is provided to position the paddle 182 in the receiving position. The paddle stop 194 can include a resilient or like pad 196 for reducing shock on the paddle 182 and for noise abatement.

Referring to FIG. 9, the compression mechanism 184 includes a plurality of rollers 198 having a back-up belt 200 therearound. At least one of the rollers 198 is a driven roller, thus driving the back-up belt 200. The belt 200 is positioned and driven to move in parallel with the moving belts 26 of the applicator 10, and to advance the labeled documents from the application section 20.

The compression mechanism 184 further includes a pair of back-up rollers **202*a*,*b* positioned to contact the rear side of the belt 200 carrying the labeled document. The back-up rollers 202*a*,*b* are mounted to a biased roller arm 204 to maintain roller 202*b* in contact with the belt 200. A non-driven compression roller 206 is positioned in opposing relation to back-up roller 202*b* to compress the belt 200 and the labeled document therebetween to assure adhesion of the label L to the document. It has been observed that the as the paddle 182 and thus the label L contact the passing document, the leading edge of the label only may contact the document and adhere thereto. The compression mechanism 184 is configured to assure that the entire label L is brought into intimate contact with the document, thus securing the label L thereto. Roller 202***a* is offset rearwardly from the rear side of belt 200 so that the application section 20 can accommodate relatively thick documents and properly position the labels L thereon.

The applicator 10 may include a control system 22 which receives input signals from the various sensors positioned on the applicator 10 to monitor and control the operation of the applicator 10. As provided previously, a pair of sensors 64*a,b*, best seen in FIG. 4, are mounted to the label guide plate 62, below the storage and feed section 16. The sensors 64*a,b* detect the presence or absence of label stock S in the label stock guide path 60. When the sensors 64*a,b* detect the absence of label stock S in the guide path 60, the feed section motor 54 is actuated to feed additional stock S from the label roll R. The control system includes a central processor unit or controller 214.

As illustrated in FIG. 3, sensors are positioned about the applicator along the document travel path 24 to detect the presence of a document in the path 24, and to control the advancement of the label stock S into the cutter section 18, the movement of the moveable blade 132 to and from the cutting position, and the actuation of the paddle 182 to contact the label L with the document.

In a current embodiment, the sensors include sensor pairs 208*a,b*, 210*a,b*, and 212*a,b*. In the front side labeling mode of operation, as will be described herein, sensor pair 210*a,b* provides a control signal for the feeding and cutting of label stock S, and sensor pair 212*a,b* provides a control signal for triggering the paddle 182 from the receiving position to the application position. In the back side labeling mode of operation, sensor pair 208*a,b* provides a control signal for the feeding and cutting of a label stock, and sensor pair 210*a,b* provides a control signal for triggering the paddle 182 from the receiving position to the application position.

The dual purpose use of sensor pair 210*a,b* minimizes the number of sensor pairs required for complete, automatic operation of the applicator system 10. It will be recognized by those skilled in the art that the physical distance between the sensor pairs 208*a,b* and 210*a,b* is the same as the physical distance between the pairs 210*a,b* and 212*a,b*. In a current embodiment, sensor pair 208*a,b* is also used as a tracking sensor to track or detect the presence or absence of a document in the applicator 10.

Operation of the applicator system 10 will now be described, with reference to the mechanical components of the system 10, and with reference to one embodiment of a control system 22 for the applicator.

Label sheet stock S is fed from the feed roll R through the feed section feed 16 rollers 56, 58. Feed roller 56 is driven by motor 54 which is actuated by a control signal from the control system 22. The control signal is generated in response to a signal from sensor pair 64*a,b* which detects demand due to the absence of feed stock S across the path of sensors 64*a,b*. The feed stock S traverses through the label guide path 60 and up to the cutting section 18. The feed stock S travels through the label travel path 86, across the manifold/fan plate 82, remaining in contact with the contact surface 98 of the plate 82. The feed stock S is held in place against the contact surface 98 (in the travel path 86) by the suction provided by the fan 88, and by the vacuum at the manifold vacuum openings 96.

Figure 7A:
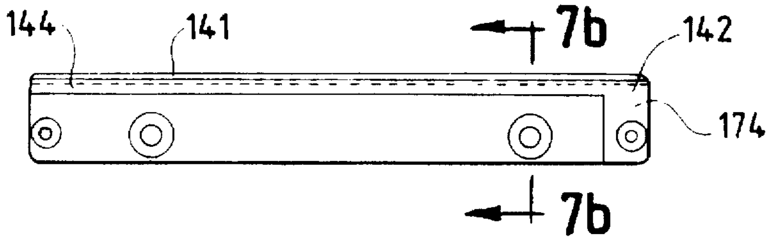
FIG. 7*a* is a plan view of the blade portion of the moveable blade member.
Figure 7B:
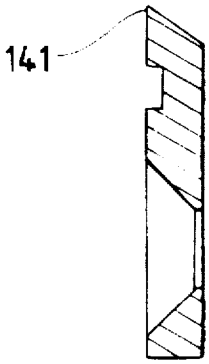
FIG. 7*b* is a cross-sectional view of the blade taken along line 7*b*—7*b* of FIG. 7*a;*
Figure 7C:
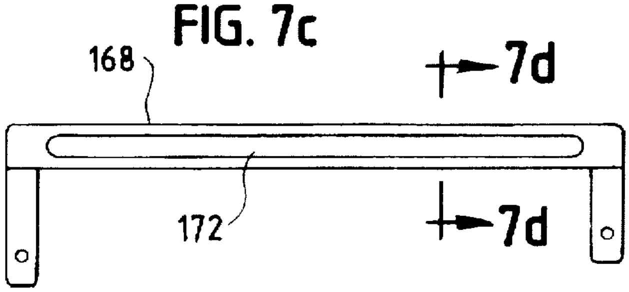
FIG. 7*c* is a plan view of the stripper portion of the moveable blade member.
Figure 7D:
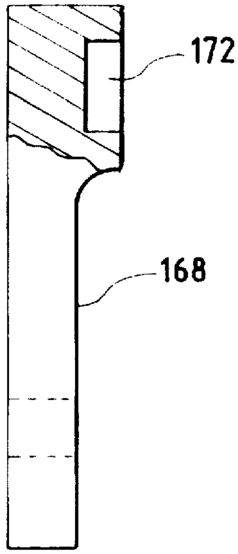
FIG. 7*d* is a cross-sectional view of the stripper portion taken along line 7*d*—7*d* of FIG. 7*c;*
Figure 7E:
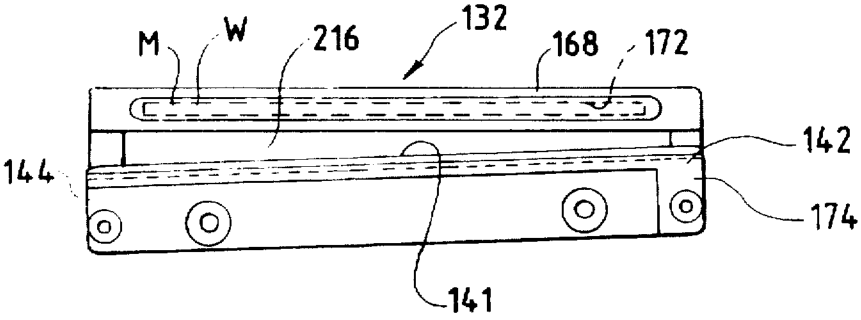
FIG. 7*e* is a plan view of the moveable blade having the stripper portion mounted to the blade portion.

Documents, such as envelopes, are fed through the applicator 10 by moving belts 26. In front side labeling mode, sensor pair 210*a,b* (pair 208*a,b* in back side labeling) detects the presence of a document in the sensor path and provides a signal to the controller 214. The controller 214 in turn generates a control signal which actuates the motor 110 to advance the feed stock S up through the gap 216 (FIG. 7*e*) between the movable and stationary blades 132, 130. During the feed sequence, the label feed stock S is held in place against the manifold/fan plate 82 and the manifold vacuum openings 96, and against the paddle 182 at the paddle vacuum openings 190. The movable blade 132 is then actuated to the cutting position and the label feed stock S is cut thereby into a discrete label L. Subsequently, the moveable blade 132 returns to the withdrawn position. As the blade 132 returns to the withdrawn position, the stripper 168 pushes label stock S from under the stationary blade 130. The controller 214 then generates a signal to reverse the feed roller 112 a short distance to pull the label stock S downward away from the cutting blade 132 to dislodge the label stock S in the event it has inadvertently adhered to the blade 132.

As the document is further advanced by the belts 26, the presence of the document is sensed by sensor pair 212*a,b* (210*a,b* in the back side labeling mode), which transmits a signal to the controller 214. The controller 214 in turn generates a control signal which actuates the paddle cylinder 192 to move the paddle 182 and thus the label L into contact with the document, and transfer the label thereto. The document having the label L at least partially adhered thereto is then advanced to the compression mechanism 184 in which the label L is pressed onto the document by the cooperation of the back-up belt 200 and roller 202*b*, and the compression roller 206. The document is then advanced out of the applicator 10 by the belts 26.

Figure 12A:
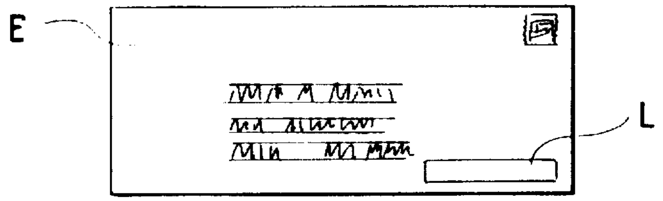
FIGS. 12*a–b* illustrate exemplary envelopes having labels positioned in front side labeling and back side labeling, respectively.

As provided previously, two modes of operation are presently contemplated for the applicator 10, namely front side labeling and back side labeling. In front side labeling, as illustrated in FIG. 12*a*, the document, such as the exemplary envelope E, is advanced through the applicator 10 with the front of the document, e.g., the address containing side of the document, facing forward for labeling. In front side labeling, the label L is applied to the lower right hand corner of the envelope, and may be used for, for example, providing a space for addition of a bar code or like machine readable indicia.

Figure 12B:
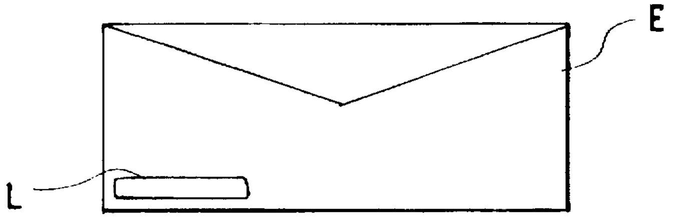

Conversely, in back side labeling, as illustrated in FIG. 12*b*, the envelope E is advanced through the applicator 10 with the back of the document, e.g., the blank or non-address containing side of the document, facing forward. In back side labeling, the label L is applied to the lower left hand corner of the envelope E, and may be used, for example, for covering an identification label which may have been placed on the envelope for storage location identification.

As provided earlier, in front side labeling mode, sensor pair is 210*a,b* used to actuate the feed and cut of label stock S, and sensor pair 212*a,b* is used to actuate or trigger the paddle 182. In back side labeling mode, sensor pair 208*a,b* is used to actuate the feed and cut of label stock S, and sensor pair 210*a,b* is used to actuate or trigger the paddle 182.

In a current embodiment, various trouble detection or malfunction detection provisions are incorporated into the applicator control system 22. Some of the exemplary trouble detection provisions will now be described. When the demand for label stock S continues for a predetermined period of time, presently about two and one-half (2½) seconds, without being met, that is, without sensor pair 64*a,b* detecting the presence of label stock S in the label stock guide path 60, the system will automatically generate a trouble signal. Likewise, if the moveable blade 132 cuts labels for a predetermined number of cycles, presently ten cycles, without sensing demand for additional feed stock S, the system will automatically generate a trouble signal. Optionally, the generation of a trouble signal can shut down the applicator system 10.

The control system may also include a manual advance button 216 to manually advance label feed stock S to facilitate clearing the applicator 10, and to facilitate threading and start-up of the applicator system 10. Those skilled in the art will recognize that other control systems and schemes may be used to provide fully automatic, or partially automatic operation of the applicator system 10. The above control system 22 is meant to be an exemplification of the control systems possible, and is not intended to limit the scope of the present invention.

In an alternate embodiment, use of the applicator system 10, portions of which are shown in phantom lines in FIGS. 4, 5 and 10, the system 10 is used to apply preprinted labels on documents as they are transported through the system 10. The alternate embodiment includes a printer 220 preferably positioned at the storage and feed section 16 (FIG. 4) and a sensor 222 preferably positioned at the cutting section 18 (FIGS. 5 and 6). The printer 220 is adpated to print indicia on the label sheet stock S as it is fed from the storatge and feed section 16. The printer 220 and methods of printing on such PSA material will be recognized by those skilled in the art. The printed indicia may include an indicium to indicate a label L cut location. The cut indicium is recognized by the sensor 222 as the preprinted sheet stock S passes along the travel path 86, past the sensor 222. The label L is then cut by the applicator cutting section 18, as provided herein, and the label L is applied to the passing document by the application section 20.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

What is claimed is:

1. A linerless label applicator for forming and applying a discrete linerless label to a document, the linerless label being formed from a continuous source of linerless label material, the apparatus being adapted to receive and advance a plurality of documents, one at a time, along a document path through the applicator, the linerless label material having a first, adhesive carrying side and a second, non-adhesive carrying side, the applicator comprising:

a label storage and feed section adapted to store the continuous source of linerless label material on a label storage member, said section having a drive element being adapted to feed the material therefrom along a label feedpath;

a label cutting section including label drive means, label guide means and a label cutting assembly, said cutting section being adapted to receive the continuous label, advance the material in discrete, predetermined amounts, and cut labels from the continuous label material, said guide means including a vacuum manifold having a surface configured to receive the label material with the non-adhesive carrying side thereon, said surface defining a plurality of vacuum openings therein being in flow communication with an associated vacuum producing source for effecting a vacuum in said openings, said guide means further including a plurality of guide elements projecting from said surface, said guide elements defining a label travel path for guiding the label material through said cutting section, said label cutting assembly including a stationary cutting blade and a moveable cutting blade mounted adjacent to said stationary blade and configured to coact therewith for cutting the label material at a predetermined position to form the discrete label, said moveable blade including a cutting edge and having drive means operably connected thereto for moving said blade in a reciprocating path toward and away from, and transverse to, a plane defined by said label travel path, said moveable blade further including a stripper member mounted thereto in spaced relation to said cutting edge; and a label application section having a pivotal paddle member mounted thereto, said paddle member having drive means for pivoting said paddle member between a receiving position and an applying position and being configured to receive the label material thereon when in said receiving position and secure the label thereto when the label material is being cut into the discrete label, and further adapted to pivot to said applying position to apply the label to the document passing in proximity thereto along the document path.

2. The linerless label applicator according to claim 1 wherein said cutting section includes a pair of feed rollers configured to feed said label material therethrough, one of said rollers being mounted so as to contact the adhesive carrying said of the label material and the other of said rollers being mounted to contact the non-adhesive carrying side of the label material, said adhesive contacting roller having a plasma coating thereon.

3. The linerless label applicator according to claim 1 wherein said storage and feed section includes a pair of feed rollers configured to feed said label material therefrom, one of said rollers being mounted so as to contact the adhesive carrying said of the label material and the other of said rollers being mounted to contact the non-adhesive side of the label material, said adhesive contacting roller having a plasma coating thereon.

4. The linerless label applicator according to claim 1 wherein said stripper member includes a lubricating well therein, said lubricating well being in spaced relation to said cutting edge, said lubricating well being configured to store a quantity of a lubricating material therein.

5. The linerless label applicator according to claim 1 wherein, said label application section further includes a compression mechanism having at least one back-up roller and a compression roller in opposing relation thereto, said compression mechanism adapted to advance the document between said back-up roller and said compression roller to adhere the label to the document.

6. The linerless label applicator according to claim 1 further including control means operably connected to said label storage and feed section drive means, said label cutting section drive means, said moveable blade drive means and said paddle drive means, and further including sensing means operably connected to said control means, said sensing means being configured to detect the presence of the linerless label material in said label feedpath.

7. A linerless label applicator for forming and applying a discrete linerless label to a document, the linerless label being formed from a continuous source of linerless label material having an adhesive applied to a side thereof, the apparatus being adapted to receive and advance a plurality of documents, one at a time, along a document path through the applicator, the linerless label material having a first, adhesive carrying side and a second, non-adhesive carrying side, the applicator comprising:

a label storage and feed section adapted to store the continuous source of linerless label material on a label storage member, said section having a drive element being adapted to feed the label material therefrom along a label feedpath, the storage and feed section including a horizontally oriented, vertically moveable label material feed member having the label material in a roll form positioned thereon and being configured to hold and feed the label material therefrom, and a horizontally oriented tangent roll, said feed member being vertically moveable relative to said tangent roll so as to maintain contact therebetween as the label material is fed therefrom, said feed member including a brake element thereon to provide tension in the label material as it is fed from said feed member;

a label cutting section including label drive means, label guide means and a label cutting assembly, said cutting section being adapted to receive the continuous label, advance the material in discrete, predetermined amounts and cut labels from the continuous label material, said guide means including a vacuum manifold being configured to receive the label material thereon and including a plurality of guide elements projecting generally transversely from said manifold defining a label travel path, said label cutting assembly including a stationary cutting element and a moveable cutting element mounted adjacent to said stationary element and configured to coact therewith for cutting the label material at a predetermined position to form the discrete label, said moveable blade including a cutting edge and having drive means operably connected thereto for moving said blade in a reciprocating path toward and away from, and transverse to, a plane defined by said label travel path;

a label application section having a pivotally driven paddle member mounted thereto, said paddle member being pivotal between a receiving position and an applying position and being configured to receive the label material thereon when in said receiving position and secure the label thereto when the label material is being cut into the discrete label, and further adapted to pivot to said applying position to apply the label to the document passing in proximity thereto along the document path; and control means operably connected to the applicator, said control means including sensing means configured to detect the presence of at least one of the linerless label material in said label feed path, and the document in the document path.

8. The linerless label applicator according to claim 7 wherein said feed member brake includes an elastomeric brake element frictionally engaged therewith for providing tension in the label material as it is fed from said feed member and to rewind the label material onto said feed member when said feed member is changed from an actuated state wherein material is fed therefrom to a non-actuated state wherein the label material feed is stopped.

9. The linerless label applicator according to claim 7 wherein said storage and feed section drive element includes a drive roller and an idler roller, said idler roller having a plasma coating thereon, said idler roller being configured to contact the label material adhesive without adhesion therebetween.

10. The linerless label applicator according to claim 7 wherein said feed member includes a vertically moveable carriage having a spindle extending therefrom, said spindle being configured to retain said label material in roll form thereon, said carriage being vertically moveable by gravitational forces acting thereon.

11. The linerless label applicator according to claim 7 wherein, said label application section includes a compression section adapted to compress the document and the label thereon to adhere the label to the document.

12. A linerless label applicator for forming and applying a discrete linerless label to a document, the linerless label being formed from a continuous source of linerless label material, the apparatus being adapted to receive and advance a plurality of documents, one at a time, along a document path through the applicator, the linerless label material having a first, adhesive carrying side and a second, non-adhesive carrying side, the applicator comprising:

a label storage and feed section adapted to store the continuous source of linerless label material on a label storage member, said section having a drive element being adapted to feed the material therefrom along a label feedpath;

a label cutting section including label drive means, label guide means and a label cutting assembly, said cutting section being adapted to receive the continuous label, advance the material in discrete, predetermined amounts, and cut labels from the continuous label material, said guide means including a vacuum manifold having a surface configured to receive the label material with the non-adhesive side thereon, said surface defining a plurality of vacuum openings therein being in flow communication with an associated vacuum producing source for effecting a vacuum in said openings, said guide means further including a plurality of guide elements projecting generally transversely from said surface, said guide elements defining a label travel path for guiding the label material through the cutting section, said label cutting assembly including a stationary cutting blade and a moveable cutting blade mounted adjacent to said stationary blade and configured to coact therewith for cutting the label material at a predetermined position to form the discrete label, said moveable blade including a cutting edge and having drive means operably connected thereto for moving said blade in a reciprocating path toward and away from and transverse to a plane defined by said label travel path, said moveable blade further including a stripper member mounted thereto;

a label application section having a pivotal paddle member mounted thereto, said paddle member having drive means for pivoting said paddle member between a receiving position and an applying position and being configured to receive the label material thereon when in said receiving position and secure the label thereto when the label material is being cut into the discrete label, and further adapted to pivot to said applying position to apply the label to the document passing in proximity thereto along the document path; and control means including sensing means configured to detect the presence of at least one of the linerless label material in said label feed path and the document in the document path, and to generate at least one control signal in response thereto.

13. The linerless label applicator according to claim 12 wherein said label cutting section stationary blade includes a contact tab, and wherein said moveable blade is angularly mounted to said cutting assembly so as to define a leading edge of said cutting edge, said leading edge being maintained in continuous contact with said contact tab as said moveable blade is moved along said reciprocating path toward and away from, and transverse to, said plane defined by said label travel path.

14. The linerless label applicator according to claim 12 wherein said cutting assembly includes a blade arm adapted to carry said moveable blade and a drive block adapted to carry said blade arm, said drive block being operably connected to drive means for moving said moveable blade in said reciprocating path between a cutting position and a withdrawn position, said label cutting assembly further including a pair of flexible connectors extending generally transversely from a plurality of mounting members positioned on said cutting assembly and a plurality of mounting members positioned on said drive block, said mounting members being configured to secure said flexible connectors thereto, said flexible connectors being configured to guide said blade arm between said cutting and withdrawn positions.

15. The linerless label applicator according to claim 14 further including radius guides positioned on said mounting members, said radius guides being to configured to receive said flexible connectors therein and to secure said flexible connectors to said cutting section and to said drive block.

16. The linerless label applicator according to claim 15, wherein said radius guides have an arcuate profile defining a range of flexure of said flexible connectors.

17. The linerless label applicator according to claim 12 wherein said label application section further includes a compression section being adapted to adhere the label to the document.

18. The linerless label applicator according to claim 12 wherein said stripper member includes a lubricating well therein, said lubricating well being in spaced relation to said cutting edge and being configured to store a quantity of a lubricating material therein.

19. The linerless label applicator according to claim 12 further including printing means adapted to print indicia on the label material as the material moves along said label feed path, wherein at least a potion of the indicia is recognizable by a sensor, said sensor being operably connected to said control means, said control means being operably connected to said cutting section label drive means and said moveable blade drive means to effect cutting of the label material at a predetermined location to form a discrete label, in response to recognition of said portion of said indicia.

* * * * *